United States Patent
Lund

(10) Patent No.: US 12,352,222 B2
(45) Date of Patent: Jul. 8, 2025

(54) CONSTANT PRESSURE FUEL ENHANCEMENT SYSTEM AND METHOD

(71) Applicant: EXEN HOLDINGS, LLC, Bradenton, FL (US)

(72) Inventor: Morten Andre Lund, Bradenton, FL (US)

(73) Assignee: EXEN HOLDINGS, LLC, Bradenton, FL (US)

( * ) Notice: Subject to any disclaimer, the term of this patent is extended or adjusted under 35 U.S.C. 154(b) by 219 days.

(21) Appl. No.: 18/035,842

(22) PCT Filed: Nov. 8, 2021

(86) PCT No.: PCT/EP2021/080958
§ 371 (c)(1),
(2) Date: May 8, 2023

(87) PCT Pub. No.: WO2022/096718
PCT Pub. Date: May 12, 2022

(65) Prior Publication Data
US 2023/0417198 A1    Dec. 28, 2023

Related U.S. Application Data

(60) Provisional application No. 63/111,254, filed on Nov. 9, 2020.

(51) Int. Cl.
*F02C 3/22* (2006.01)
*F02C 3/20* (2006.01)
(Continued)

(52) U.S. Cl.
CPC .............. *F02D 19/081* (2013.01); *F02C 3/20* (2013.01); *F02C 3/22* (2013.01); *F02C 7/22* (2013.01);
(Continued)

(58) Field of Classification Search
CPC .... F02C 3/22; F02C 7/22; F02C 7/236; F02D 19/0628; F02D 19/0642; F02D 19/0644;
(Continued)

(56) References Cited

U.S. PATENT DOCUMENTS 9,945,299 B2    4/2018  Lund
2011/0023853 A1*  2/2011  Lund ................... F02D 19/081
                                                      123/590

(Continued)

FOREIGN PATENT DOCUMENTS

DE    102013003982 A1    9/2014
WO    2017205681 A1    11/2017

OTHER PUBLICATIONS

PCT International Search Report corresponding to Application No. PCT/EP2021/080958, dated Apr. 4, 2022.
(Continued)

*Primary Examiner* — Erick R Solis
(74) *Attorney, Agent, or Firm* — Hoffmann & Baron, LLP

(57) ABSTRACT

A fuel enhancement method and system for supplying the engine with a pressurized fuel mixture comprising a mixture of the liquid fuel and the gaseous component including provisions to maintain the ratio of gas to liquid in the mixture at a predetermined value and maintain the pressure of the fuel mixture applied to the engine at a predetermined value. A system using variable speed drive pumps is disclosed.

32 Claims, 8 Drawing Sheets

(51) Int. Cl.
| | |
|---|---|
| *F02C 7/22* | (2006.01) |
| *F02C 7/236* | (2006.01) |
| *F02D 19/06* | (2006.01) |
| *F02D 19/08* | (2006.01) |
| *F02D 19/10* | (2006.01) |
| *F02M 37/00* | (2006.01) |

(52) U.S. Cl.
CPC .......... *F02C 7/236* (2013.01); *F02D 19/0605* (2013.01); *F02D 19/0628* (2013.01); *F02D 19/0644* (2013.01); *F02D 19/0647* (2013.01); *F02D 19/0671* (2013.01); *F02D 19/10* (2013.01); *F02M 37/0064* (2013.01); *F05D 2210/13* (2013.01)

(58) Field of Classification Search
CPC .. F02D 19/0647; F02D 19/10; F02M 37/0064
USPC .............................. 123/27 GE, 525, 585, 586
See application file for complete search history.

(56) References Cited

U.S. PATENT DOCUMENTS

2012/0145126 A1* 6/2012 Krug .................... F02D 19/0647
123/457
2012/0186560 A1* 7/2012 Lund .................... F02D 19/0684
123/495

OTHER PUBLICATIONS

PCT International Preliminary Report on Patentability corresponding to Application No. PCT/EP2021/080958, dated May 8, 2023.

* cited by examiner

CONSTANT PRESSURE FUEL ENHANCEMENT SYSTEM AND METHOD

CROSS-REFERENCE TO RELATED APPLICATIONS

This application is a National Phase application of International Application No. PCT/EP2021/080958 filed Nov. 8, 2021, which claims the benefit of priority to U.S. Provisional Patent Application Ser. No. 63/111,254 filed on Nov. 9, 2020, the disclosures of which are incorporated herein by reference for all purposes.

TECHNICAL FIELD

The present invention relates in general to fuel systems, and in particular to those systems that provide a pressurized mixture of liquid fuel and gaseous fuel to an internal combustion or turbine engine.

BACKGROUND OF THE INVENTION

Fuel systems for internal combustion and turbine engines typically include a liquid fuel source, one or more pressurizing pumps (often referred to as booster pumps), an injection mechanism for controllably introducing the fuel into a combustion chamber, and fuel lines interconnecting the components. The liquid fuel source, typically one or more tanks, various fuel filters, sometimes lift/transfer pumps supplies the fuel from the tanks. The pressurizing (booster) pump(s), typically either mechanically driven by the engine, or electrically driven, are used to increase the pressure of the fuel applied to the injector mechanism to the level desired for proper operation of the injection mechanism.

The injection mechanism timely injects a metered amount of atomized fuel into each combustion chamber at a pressure sufficiently high to overcome compression pressure and properly disperse the fuel into the combustion space. Various types of injection mechanisms are known. One commonly used injection mechanism employs a separate injector and pump (sometimes combined as a single unit) for each combustion chamber. The individual pumps are typically mechanically actuated using the engine camshaft to generate fuel injection pressure. The injector is either mechanically controlled using a mechanical linkage system cooperating with the engine governor or throttle, or electronically controlled using solenoid valves or piezo-electric triggered actuators responsive to control signals from an electronic control unit (ECU), typically the ECU associated with overall operation of the engine. Other mechanisms employ a respective injector unit for each combustion chamber which cooperates with a respective individual pump in a common housing (e.g., a multi-plunger in-line pump system), or with a rotary pump system which delivers fuel at high pressure to individual injectors in the proper firing order. In both cases the pumps are typically driven by the engine. Another commonly used injection mechanism, often referred to as a common rail system, employs a common fuel rail (manifold) cooperating with a high-pressure pump (often referred to as the injector pump) to supply high-pressure fuel to electronically (e.g., ECU) controlled solenoid or piezo actuated injectors associated with the respective engine combustion chambers. The high-pressure pump is typically driven by the engine.

In all of the commonly used injection mechanisms, only part of the fuel applied to the injection mechanism is actually injected into the combustion chamber, the amount of fuel injected being in accordance with the load on the engine. The remainder of the fuel flows out of the injection mechanism and is returned to the fuel tank. In some cases, the return fuel is used to lubricate and or cool the injectors and is directed through a heat exchanger for cooling and or filtered before being returned to the fuel tank.

In general, fuel enhancement systems that provide a pressurized mixture of liquid fuel and gaseous component to an internal combustion engine are known. Examples of such systems are described in U.S. Pat. No. 9,945,299, issued on Apr. 17, 2018, U.S. Pat. No. 8,333,171 issued Dec. 18, 2012, and U.S. Pat. No. 7,861,696 issued on Jan. 4, 2011 (RE 45,413 reissued Mar. 17, 2015), to the present inventor, and commonly owned herewith. An example of a fuel composition comprising a mixture of liquid fuel and gaseous fuel is described in published patent application 20130269243 by Morten A. Lund, dated Oct. 17, 2013. Such liquid-gaseous mixture systems provide for significant increases in the efficiency of operation of the engines, and reduced emissions as compared to engines utilizing conventional liquid fuel.

However, the engine pressurizing pump and other components of the fuel systems commonly employed with internal combustion and turbine engines are designed for use with liquid fuel. The presence of substantial amounts of a gaseous component in the fuel mixture applied to such fuel systems can sometimes cause cavitation, undesirable fluctuations in pressure at the fuel system pumps and/or instabilities in engine operation. Further, there can be difficulties restarting the engine in the presence of a gaseous component before proper operating pressures are established. These issues are exacerbated in systems subject to variation in liquid fuel input pressure due to depletion from gravity fed tanks, and systems employed in applications where the engine load varies (e.g., in a generator system where the output power demand varies, or varying throttle demand or terrain in a vehicular system). Increases in engine load are reflected as a decreased localized pressure at the input to the engine pressurizing pump. That decreased pressure tends to cause the gaseous component in the fuel mixture to expand into bubbles of a size, i.e., increase the volumetric ratio of gas to liquid to a point, that the characteristics of the fuel mixture are no longer substantially that of a liquid, potentially causing a problematic level of cavitation, and, in some cases preventing sufficient amounts of liquid fuel from being provided to the engine, causing the engine to stall.

Additionally, fluctuations in the volume per unit of mass of the gaseous component tend to occur due to, e.g., variations in temperature and, given the compressible nature of gas, pressure. Analogous fluctuations do not tend to occur in the liquid fuel; in general, the liquid fuel is essentially not compressible, and volume per unit of mass changes due to temperature are insignificant. When conventional metering of volumetric flow of the gas component is employed to establish the percentage of gaseous component relative to liquid components in the fuel mixture, such fluctuations can cause undesirable changes in operative percentage of the gaseous component in the mixture.

It is desirable that the fuel mixture supplied to the input of the engine pressurizing pump be maintained at sufficiently high pressure to prevent formation of problematically large gas bubbles, i.e., problematically large gas to liquid volumetric ratios of the mixture applied to the pressurizing pump, and thus, that liquid-gaseous mixture fuel enhancement systems be able to consistently provide the desired pressures, while accommodating both the liquid and gaseous components of the fuel mixture. Accordingly, there is a need for a fuel enhancement system providing a fuel mixture of liquid and gaseous components at a substantially constant mixture ratio and pressure irrespective of engine load and fluctuations in the volume per unit of mass.

SUMMARY OF THE INVENTION

In one aspect of the present invention, a fuel enhancement system supplies an engine with a pressurized fuel mixture of liquid fuel and gaseous component. A metering device provides indicia of the flow of the liquid makeup fuel supplied to the fuel enhancement system during operation of the engine. A flow control device supplies a controlled flow of gaseous component having a flow corresponding to a desired proportion of the flow of the liquid makeup fuel supplied to the fuel enhancement system. The metered liquid makeup fuel, the controlled flow of gaseous component, and at least part of the return fuel mixture from the engine are provided to the input of a variable pressure pump system. The pump system cooperates with an infusion volume configured such that the fuel mixture that has flowed through the infusion volume has bubbles of the gaseous component distributed substantially uniformly throughout the mixture. The engine is supplied with fuel mixture that has flowed through the infusion volume at a pressure established by the pump system. A control system generates control signals to the pump system such that the pressure of the fuel mixture supplied to the engine is maintained substantially at a predetermined pressure value.

In accordance with another aspect of the invention, the liquid fuel metering device generates indicia of the mass flow of the liquid fuel, and the gaseous component flow control device supplies a controlled flow of gaseous component having a mass flow corresponding to a desired proportion of the mass flow of the liquid makeup fuel supplied to the fuel enhancement system.

In another aspect of the invention, the pump system comprises at least one variable speed drive pump.

In accordance with another aspect of the invention, used where the engine includes an injection mechanism which employs a pressurizing pump susceptible to degraded pumping efficiency in the presence of a fuel mixture having a volumetric ratio of gaseous component to liquid fuel exceeding a threshold value, the pump system and control system cooperate to maintain the pressure of the fuel mixture supplied to the engine at a value such that the volumetric ratio of gaseous component to liquid fuel is maintained below the threshold value.

Another aspect of the invention involves a method for supplying an engine with a pressurized fuel mixture having a liquid component and a gaseous component. A metered mass flow of the liquid fuel component and a controlled mass flow of the gaseous fuel component corresponding to a desired proportion of the metered mass flow of the liquid fuel component are combined with return fuel from the engine into a mixture flow. The mixture flow is passed through an infusion volume such that the gaseous component is distributed substantially uniformly throughout the mixture, then applied to the engine at a substantially constant pressure.

In another embodiment of the invention, a fuel enhancement system supplies an engine with a pressurized fuel mixture of liquid fuel and gaseous component. A metering device generates indicia of the metered flow of the liquid fuel supplied to the fuel enhancement system during operation of the engine. A flow control device supplies a controlled flow of gaseous component. At least a first variable speed drive pump receives the metered flow of the liquid fuel and the controlled flow of gaseous component, and responsive to control signals applied thereto, provides an output flow of liquid-gaseous component fuel mixture at an output pressure in accordance with the speed thereof. A first pressure sensor generates indicia of the output pressure of the first variable speed drive pump. The output flow of liquid-gaseous component fuel mixture from the first variable speed drive pump is provided to an infusion volume configured to provide an output flow of fuel mixture having bubbles of the gaseous component distributed substantially uniformly throughout the fuel mixture. The output flow of the infusion volume is applied to at least a second variable speed drive pump, which, responsive to control signals applied thereto, provides an output flow of liquid-gaseous component fuel mixture at an output pressure in accordance with the speed thereof. A second pressure sensor generates indicia of the output pressure of the second variable speed drive pump. And, a control system, responsive to indicia of the metered flow of liquid fuel, indicia of the output pressure of first variable speed drive pump and indicia of the output pressure of the second variable speed drive pump, generates control signals to the gaseous component flow control device, such that the controlled flow of gaseous component corresponds to a desired proportion of the metered flow of liquid fuel, to the first variable speed drive pump such that the output pressure of the first variable speed pump is maintained substantially equal to a first predetermined pressure, and to the second variable speed drive pump such that the output pressure of the second variable speed pump is maintained substantially equal to a second predetermined pressure. The output flow of the second variable speed drive pump is supplied to the engine.

In accordance with another aspect of the invention the gaseous component is compressed air.

In accordance with another aspect of the invention the gaseous component is hydroxy.

BRIEF DESCRIPTION OF THE DRAWINGS

Preferred embodiments of the present invention will hereinafter be described in conjunction with the Figures of the appended drawing, wherein like designations denote like elements unless otherwise specified, and.

DETAILED DESCRIPTION OF PREFERRED EMBODIMENTS

Figure 1:
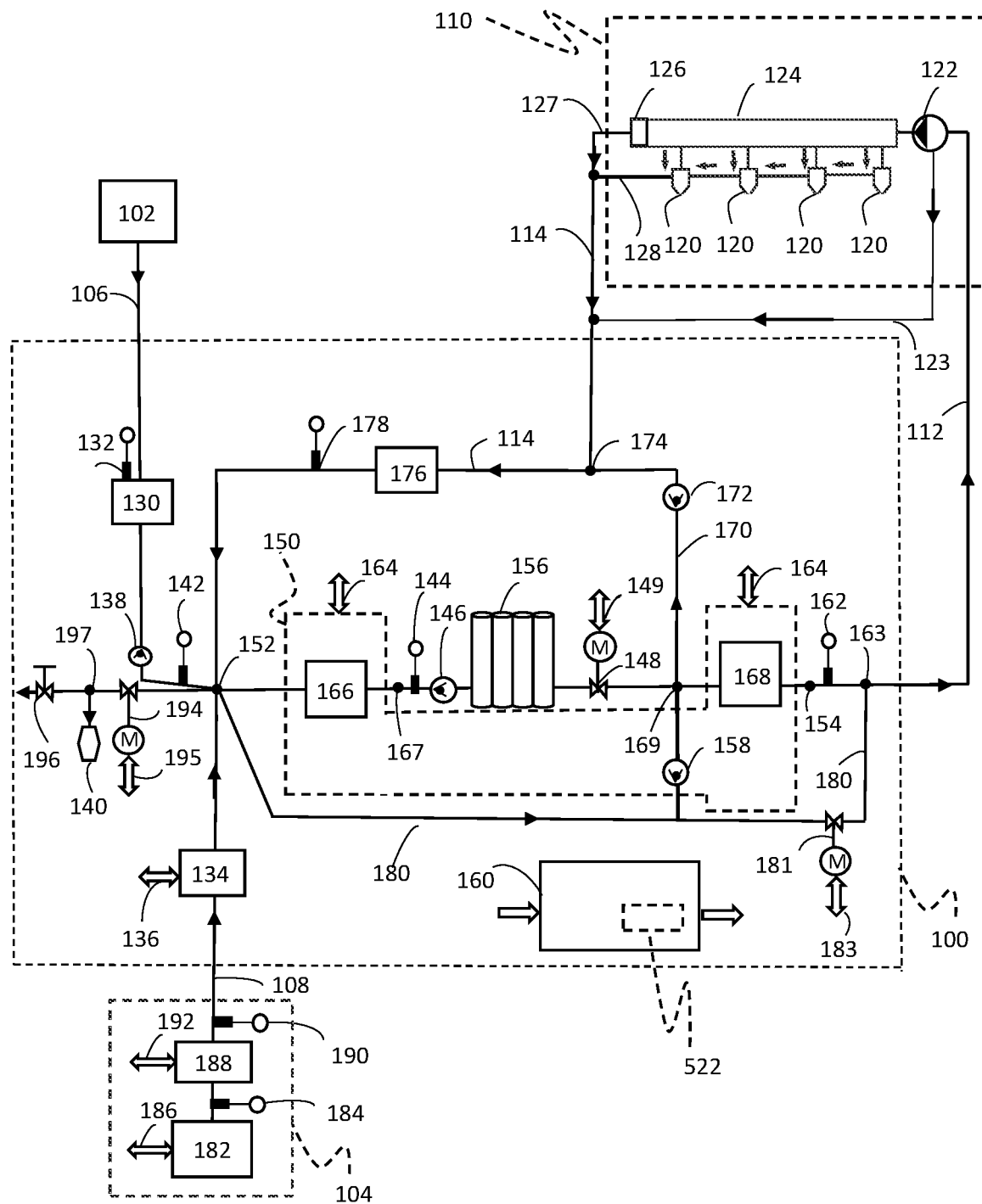
FIG. 1 is a simplified block schematic of a fuel system embodying aspects of the present invention cooperating with a common rail engine.

Referring now to FIG. 1, a fuel system 100 cooperates with a liquid fuel source 102 and a source of gaseous component 104, to supply an engine 110 with a pressurized fuel mixture having liquid and gaseous components. Liquid fuel and the gaseous component (sometimes hereinafter referred to as the gas) are provided to system 100 from liquid fuel source 102 and gas source 104 through a liquid fuel input line 106 and a gas input line 108, respectively. System 100 combines the liquid and gas into a gas-liquid fuel mixture having a predetermined ratio of gaseous component to liquid component and provides the gas-liquid fuel mixture to engine 110 through a fuel line 112 at a substantially constant predetermined pressure. The return fuel from engine 110 (that portion of the fuel applied to the engine injection mechanism but not actually injected into the combustion chamber) exits engine 110 through a return fuel line 114 and is suitably fed back to system 100. In some embodiments, portions of the return fuel can be utilized for, e.g., lubrication and/or cooling of various components.

Examples of suitable liquid fuel include diesel, biodiesel and heavy fuel oil. Liquid fuel source 102 may comprise one or more tanks, fuel filters and/or lift/transfer pumps and, in some cases, mechanisms for establishing and maintaining a desired fuel viscosity. The pressure of fuel provided from fuel source 102 should be sufficiently high to overcome any back pressure from return line 114. In large generator systems, liquid fuel, e.g., diesel, may be pumped from a main tank or reservoir into a smaller day tank from which the liquid fuel is pumped or gravity fed through various filters to one or more engines associated with the generators. In vehicular systems, liquid fuel source 102 may comprise a conventional vehicle fuel tank and associated fuel pumps and filters. In general, during operation, the liquid fuel dispensed from source 102 corresponds to the liquid fuel consumed by engine 110 and will sometimes be referred to herein as makeup fuel.

Examples of suitable gaseous component may be, for example, compressed air, hydrogen, or hydroxy. Gaseous component source 104 may comprise a pre-pressurized tank of the gas or a mechanism for generating the gas, and in some instances treating the gas.

In the embodiment of FIG. 1, engine 110 suitably employs a common rail injection mechanism comprising injectors 120 associated with the respective engine combustion chambers (not explicitly shown), a high-pressure injector pump 122, and a common fuel rail (manifold) 124, suitably with a pressure control device 126 (e.g., a high-pressure regulator, or an electronically controlled pressure control valve cooperating with the ECU). Injector pump 122 receives the pressurized gas-liquid fuel mixture from system 100 via fuel line 112. Injector pump 122 may incorporate a capillary bleed device, represented as bleed line 123, to protect against pump failure (and particularly seal failure) in the event of exposure to pressures in excess of the pump's ratings and/or prolonged exposure to high pressures when engine 110 and system 100 are turned off. Fuel mixture and any off gassing from the fuel mixture contained in pump 122 when engine 110 is shut down is bled off through line 123 to return fuel line 114. A suitable capillary bleed device 123 is described in U.S. Pat. No. 9,945,299, issued on Apr. 17, 2018 to the present inventor, and commonly owned herewith. If desired, fuel filters (not shown) may be included in line 112 upstream of injection pump 122, and injector pump 122 may also include a pressure control return line (not shown) as part of the pump pressure regulation mechanism.

Pump 122, suitably driven by engine 110, continuously delivers the fuel mixture to common rail 124. Common rail 124 accumulates the fuel mixture and maintains the fuel mixture under relatively high pressure for application to injectors 120. Injectors 120 are suitably electronically controlled (control lines not shown) by the engine control unit (ECU). When actuated, each injector 110 injects a metered amount of fuel from common rail 124 as a large number of small droplets (e.g., an atomized spray) into the associated combustion chamber at a pressure sufficiently high to overcome compression pressure and properly disperse the fuel into the combustion space. As engine load (or throttle demand) changes, the amount of fuel injected into the combustion chambers changes accordingly. Increases and decreases in the amount of fuel injected into the combustion chamber causes a corresponding increase or decrease in the amount of makeup fuel provided by liquid fuel source 102, and tend to cause the localized pressure at the input of pump 122 to decrease or increase, respectively.

Excess fuel mixture from common rail 124 (e.g., fuel not retained in common rail 124 or used by injectors 120) and from injectors 120 (e.g., fuel flowing into injectors 120, but not injected into the combustion chambers of engine 110) comprise contributions to the return fuel, excess rail fuel and excess injector fuel flowing through lines 127 and 128 to return fuel line 114 and thence to system 100.

In the embodiment of FIG. 1, fuel system 100 comprises: a metering device, e.g., liquid flowmeter 130; a gas flow control device 134; a variable pressure pump system 150 having an input 152 and output 154; an infusion volume 156; and a suitable controller 160 (sometimes hereinafter referred to as control unit 160), cooperating with at least one pressure sensor 162. Variable pressure pump system 150 suitably includes first and second variable pressure pump sets, 166 and 168, respectively. If desired, fuel system 100 may also comprise: respective check valves 138, 146 and 158; an accumulator 140; pressure sensors 142 and 144; motorized two-way valves 148, 181 and 194; a manual valve 196; a pressure controlled low fuel volume bypass line 170 that may include a pressure relief valve 172; a heat exchanger 176; a temperature probe 178; and a system bypass line 180 (which may include check valve 158 and motorized valve 181).

Controller 160 may be any device or system capable of receiving indicia of various operating parameters and generating the control signals necessary to maintain the ratio of gaseous component to liquid fuel in accordance with a predetermined formula or algorithm and to maintain various pressures at predetermined values. Controller 160 may comprise, e.g., a microcontroller, microprocessor-based or programmed logic unit (e.g., programmed logic controller), programmed in accordance with conventional techniques, and/or various discrete control devices. A microcontroller, microprocessor-based or programmed logic-based controller 160 would typically include a central processing unit with associated memory, a communication interface, and respective input/output modules such as discrete (on/off), analog, digital and/or special modules such as high-speed counters. While controller 160 is shown in FIG. 1 as a single element, in practice it may be multiple elements distributed throughout system 100 and/or associated cooperating devices, or may be implemented within the engine ECU. For purposes of clarity, various power connections are omitted from the drawing and not all of the control and input/status signal transmission paths between controller 160 and the various elements are shown in the drawing or described, and, when shown, multiple connections are sometimes represented by a single line in the drawing. When referenced, control signals from, and input signals to controller 160 will be referred to by a parenthetical reference to the designation of the transmission paths through which they are transmitted or terminal to which or from which they are provided.

Flowmeter 130 receives liquid makeup fuel from source 102 via line 106 and generates indicia (132) of the flow of makeup fuel, communicated to controller 160. Flow control device 134 receives gas provided by source 104 via input line 108 and, responsive to control signals (136) from controller 160, supplies a controlled flow of gas. As will be explained, the flow of gaseous component output by flow control device 134 is proportional to the flow of liquid makeup fuel through flowmeter 130, preferably such that the mass ratio of gas to liquid in the fuel mixture is maintained at a substantially constant value (e.g., 1:1), irrespective of fluctuations in pressure or environmental conditions.

The liquid makeup fuel flowing through flowmeter 130, the gas provided through flow controller 122, and the return fuel through engine return line 114 are all in fluid communication with input 152 of variable pressure pump system 150. The amount of makeup fuel drawn into pump system 150 at input 152 is a function of the extent to which the return fuel through engine return line 114 is sufficient to support the predetermined output pressure of pump system 150 (or a predetermined intermediate output pressure of first pump set 166). To the extent that the amount of return fuel is not sufficient, the localized pressure at pump system input 152 decreases, effectively drawing makeup fuel from liquid fuel source 102. The process of mixing the gas and liquid fuel components is started as the components are brought together at input 152 of pump system 150. As will be discussed, pump system 150 then cooperates with infusion volume 156 to establish and maintain homogeneity of the gas-liquid mixture.

In addition, pump system 150, responsive to control signals (164) from controller 160, establishes and maintains the pressure of the fuel mixture applied to engine injection pump 122 through line 112 at a substantially constant predetermined value (e.g., 100 psi) sufficiently high to ensure that the gas-liquid mixture applied to pump 122 has essentially liquid characteristics irrespective of variations in the pressure at pump system input 152, the amount of makeup fuel drawn from liquid fuel source 102 and the tendency of the input pressure of pump 122 to vary in response to changes in engine load. As will be explained, the pressure of the fuel mixture at pump system output 154 is monitored, e.g., by pressure monitor 130 in cooperation with control unit 128, and control signals (164) generated accordingly. The control process may also include monitoring intermediate pressures and control of individual elements of pump system 150.

During operation of system 100, the pressure at input 152 of pump system 150 is established primarily by the relatively low pressure at which makeup fuel is provided to system 100 from source 102. Where liquid fuel source 102 includes a regulated pump, that pressure is relatively constant. In other cases, such as when liquid fuel source 102 comprises a tank from which makeup fuel is gravity fed, the input pressure can vary. Such variation is typically within a range of values (e.g., from 1 to 10 psi), in accordance with the amount of liquid fuel in the tank, i.e., the pressure decreases as the fuel in the tank is depleted. Further, in some circumstances the gas component from gas source 104, or the return fuel from line 114 affect the pressure at pump system input 152. Pump system 150 accounts for the variations in input pressure and increases the pressure from the relatively low pressure at input 152 to a significantly higher predetermined pressure (e.g., 100 psi) at output 154. This increase in pressure is preferably implemented in stages, e.g., first and second variable pressure pump sets 166 and 168, respectively, with increasing parts of the ultimate pressure increase being performed by the downstream pump set(s), e.g., pump set 168. Pump sets 166 and 168 are serially connected (albeit with infusion volume 156 intervening between the pump sets). First pump set 166 has an input (input 152 of pump system 150) and an output 167 connected (suitably through check valve 146) to the input of infusion volume 156. The output of infusion volume 156 is connected (suitably through motorized valve 148) to the input 169 of second pump set 168. By way of example, first pump set 166 suitably increases the pressure from that at input 152 (e.g., 1 to 5 psi) by a first variable factor in accordance with control signals 164 such that the output of first pump set 166 is equal to a predetermined intermediate value, (e.g., 20 psi). Such intermediate value is preferably sufficiently high for stable operation of infusion volume 156. Second pump set 168 suitably increases the pressure from that exiting infusion volume 156 (e.g., approximately 20 psi) by a second variable factor in accordance with control signals 164 such that the pressure at pump system output 154 is equal to the desired pump system output pressure (e.g., 100 psi). The desired pump system output pressure is suitably chosen such that the volumetric ratio of gas to liquid in the mixture is such that the fuel mixture has substantially liquid characteristics. Increasing the pressure in stages in such a manner tends to improve pump efficiency while decreasing overall power demands for operation of the pumps. Pump efficiency tends to improve as the gas to liquid volumetric ratio decreases. The first pump receives a fuel mixture having a higher gas to liquid volumetric ratio. The subsequent stages operate upon a mixture where the gas is compressed by operation of the initial stage, and thus provide increased pressure more efficiently.

Pump sets 166 and 168 can each comprise one or more conventional variable pressure pumps, preferably two or more serially connected pumps. Use of multiple pumps in pump set 166 and/or 168 provides further staging of the pressure increase. Further staging the pressure increase permits more of the work to be performed by subsequent stages operating upon more compressed mixtures and thus more efficient. In such case, pump sets 166 and 168 are each responsive to control signals (164) from controller 160 to produce the respective desired predetermined output pressures. Pump sets 166 and 168 (and the individual pumps comprising pump sets 166 and 168) can be commonly controlled in accordance with deviations in the pressure at pump system output 154 from the desired value (i.e., responsive to control signals (164) derived from the output pressure indicia by pressure sensor 130) or individually controlled in accordance with associated predetermined intermediate pressures in cooperation with, additional pressure sensors, such as pressure sensor 144, disposed to generate indicia of the output pressure of the individual pumps. For example, second pump set 168 can be controlled in accordance with the pressure as measured by the sensor 130, and first pump set 166 controlled (separately from pump set 168) in accordance with the pressure measured by sensor 144.

It is advantageous to implement one or both of pump sets 166 and 168 using one or more variable speed drive pumps, and preferably two or more serially connected variable speed drive pumps. The variable speed drive pumps comprising pump sets 166 and 168 are each responsive to control signals (164) from controller 160 such that the speeds (RPM) thereof are varied to produce the respective desired predetermined output pressures. Alternative embodiments of pump sets 166 and 168 and control arrangements therefor will be described in conjunction with FIGS. 2A, 2B, and 3.

As previously noted, pump system 150 cooperates with infusion volume 156 to establish and maintain homogeneity of the gas-liquid mixture. Infusion volume 156 is serially connected, interposed between, pump sets 166 and 168. The gas-liquid fuel mixture flows through infusion volume 156 under pressure established by first pump set 166 such that the gaseous component infuses into the liquid fuel and is uniformly distributed throughout the mixture in relatively small uniformly sized bubbles. Infusion volume 156 is suitably of the type described in U.S. Pat. No. 9,945,299 issued to the present inventor on Apr. 17, 2018, and commonly owned herewith. Second pump set 168 then increases the pressure to further compress the gas bubbles to the point where the gas-liquid fuel mix exhibits substantially liquid characteristics.

It is desirable to maintain at least a predetermined minimum level (e.g., ½ gallon per minute) of fuel flow through infusion volume 156 to avoid potential stagnation irrespective of engine load, the amount of makeup fuel drawn from liquid fuel source 102, and the volume of flow through line 112 to engine 110. Accordingly, systems where the typical volume of fuel flow into the engine is less than the minimum value, e.g., relatively small engine systems, it is desirable to include provisions, e.g., bypass 170, to maintain at least the minimum flow. For example, in the system of FIG. 1, pump system 150 is suitably designed to provide a flow of fuel mixture (a combination of return fuel, makeup fuel and gaseous component) which is in excess of that which injection pump 122 is designed to accept by at least the desired minimum flow through infusion volume 156, and in some applications designed to provide a maximum flow that is a multiple of (e.g., 3 times) the nominal maximum input for which pump 122 is designed. Bypass line 170, including pressure relief valve 172, can be placed at input 169 of second pump set 168, with pressure relief valve 172 set to provide flow at a set point slightly lower than the designated output pressure (e.g., 20 psi) of first pump set 166. Since, in the system of FIG. 1, pump system 150 is suitably designed to provide a flow of fuel mixture (a combination of return fuel, makeup fuel and gaseous component) which is in excess of that which injection pump 122 is designed to accept by at least the desired minimum flow through infusion volume 156, the entire flow passes through the pump set 166 and infusion volume 156, exiting infusion volume 156 at substantially constant pressure, e.g. approximately 20 psi. Since the bypass line pressure relief valve 172 is set to open at a slightly lower pressure, e.g., 15 psi, a portion of the fuel mixture will flow through the bypass line and the remainder will flow to the input of second pump set 168. This arrangement can advantageously save power since second pump set 168 will pump only the smaller flow that is called for by injector pump 122. In some cases, pressure relief valve 172 can be omitted, effectively replaced by utilizing a small diameter bypass line to restrict flow and create an appropriate back pressure.

Alternatively, bypass line 170, including pressure relief valve 172, may be provided between pump system output 154 and return fuel line 114 (connection point 174). In this case, pressure relief valve 172 controllably provides a one-way connection from pump system output 154 to return line 114 when the pressure differential between pump system output 154 and return fuel line 114 exceeds a predetermined value, suitably equal to or slightly less than the desired pressure in line 112. Accordingly, fuel output by pump system 150 in excess of that which is accepted by injection pump 122 is routed through bypass line 170 and looped back to input 152 of pump system 150 to maintain at least the minimum flow through infusion volume 156.

When the system 100 is shut down (particularly in the event of an emergency shut down, e.g., engine failure or forced shutdown), existing pressures within the system may cause undesirable backflow or outflows of the fuel mixture in the system at the time of shutdown or cause undue stress on the seals of various systems components. Accordingly, check valve 138 may be disposed downstream of flow meter 130 to prevent backflow into flowmeter 130, check valve 146 disposed upstream of infusion volume 156 to prevent backflow from and depressurization of infusion volume 156, and motorized valve 148 disposed downstream of infusion volume 156. Motorized valve 148, responsive to control signals (149), is open during normal operation of system 100, permitting flow of gas-liquid fuel mixture from infusion volume 156 to second pump set 168, and then, through second pump set 168, to line 112 and engine injection pump 122.

When system 100 is shut down, valve 148 is closed, to controllably prevent outflow from and depressurization of infusion volume 156. In addition, accumulator 140 may be provided in fluid communication with return fuel line 114, to accommodate return fuel in line 114 and existing pressures when the system is shut down. A suitable accumulator is described in U.S. Pat. No. 7,861,696 issued Jan. 4, 2011, to the present inventor and commonly owned herewith. If desired, pressure sensor 142 may be included to provide indicia of the pressure at input 152 of pump system 150, for e.g., informational purposes. Accumulator 140 is suitably sized to accommodate sufficient volume of gas-liquid fuel mixture when the system is turned off that the residual pressure will not exceed a predetermined maximum value, e.g., 10 psi. If desired, motorized valve 194, responsive to control signals 195 from controller 160, can be employed to selectively couple accumulator 140 to return fuel line 114 when system 100 is shut down. Wherever desirable, a manual valve 196 may be provided, connected downstream of juncture 152 to provide for draining the fuel mixture to an external fluid receiver (e.g., vented tank, not shown).

Under some circumstances, e.g., initialization, maintenance or repair of system 100, it may be desirable to controllably bypass portions of system 100 so that unaltered liquid fuel is supplied to engine 110. That may be accomplished, for example, by system bypass line 180, including check valve 158 and motorized valve 181. System bypass line 180 provides selective fluid communication between input 152 of pump system 150 and input 169 of second pump set 168 (bypassing pump 166 and infusion tubes 156) or between input 152 of pump system 150 and line 112 and hence to the input to injector pump 122 (bypassing system 100 altogether). Check valve 158 is disposed in bypass line 180 to permit flow of unaltered liquid fuel as applied to pump system input 152 to second pump set input 169 only when the pressure at input 169 is less than that at pump system input 152. During normal operation of system 100, with motorized valve 148 open and motorized valve 181 closed, the pressure at juncture 169 is approximately that established by first pump set 166, higher than the pressure at pump system input 152, and check valve 158 therefore prevents flow through system bypass line 180. When motorized valves 148 and 181 are both closed, however, the pressure at juncture 169 is essentially zero, less than the pressure at pump system input 152, check valve 158 opens, and unaltered liquid fuel flows through bypass line 180 and second pump set input 169. On the other hand, when motorized valve 148 is closed and valve 181 is open, however, the pressure differential across check valve 158 is not sufficient to open the valve, and unaltered liquid fuel flows through bypass line 180 to line 112 [juncture 163] and hence to the input of injector pump 122.

In some circumstances, particularly in systems wherein the return fuel is employed to cool various components, it may be desirable to include heat exchanger 176 in return fuel line 114 upstream of pump system input 152. In such a system, temperature probe 178, disposed to generate indicia of the return fuel temperature for communication with controller 160, which effects a warning, or shuts down the system if the return fuel temperature exceeds a predetermined value.

As noted above, the flow of gaseous component output by flow control device 134 is proportional to the flow of liquid makeup fuel through flowmeter 130, preferably such that the mass ratio of gas to liquid in the fuel mixture is maintained at a substantially constant value (e.g., 1:1), irrespective of fluctuations in pressure or environmental conditions. Flow control device 134 is preferably a gas mass flow controller compatible with the particular gaseous component employed and anticipated flow rates. For example, a suitable gas mass flow controller for compressed air, hydrogen, and hydroxy with anticipated gas flow rates between 0.0001 slpm and 20 slpm is an Alicat Scientific MC-20SLPM-D mass gas flow controller.

Figure 2:
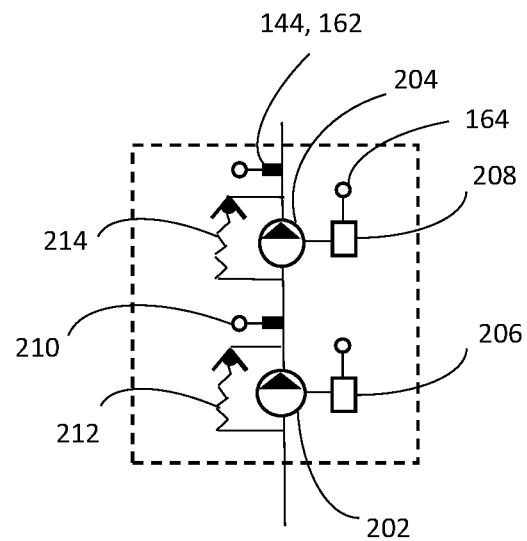
FIG. 2A and FIG. 2B are simplified block schematics of alternative embodiments of variable pressure pump sets suitable for use in the system of FIG. 1.
Figure 2:
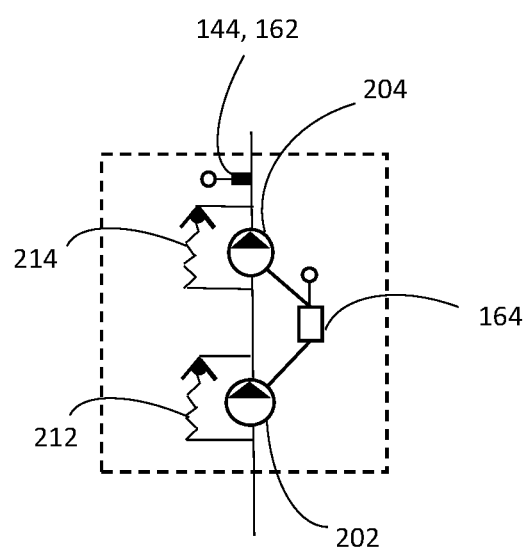

As previously noted, one or both of variable pressure pump sets 166 and 168 may be implemented using variable speed drive pumps. Referring now to FIG. 2A, one such embodiment 200 of a pump set suitable for use as either or both of variable pressure pump sets 166 and 168 comprises first and second serially connected variable speed drive pumps 202 and 204 cooperating with associated variable power supply drives 206 and 208, and an additional pressure sensor 210 disposed to measure the pressure at the output of pump 202. Pumps 202 and 204 may also cooperate with respective associated shunting pressure relief valves 212 and 214 operating as safety valves, set to open if the output pressure of the associated pump exceeds the predetermined output pressure of the pump by a predetermined amount, e.g., 10 psi. Pumps 202 and 204 effect the overall pressure gain to bring the output of the pump set to the desired pressure in stages as previously described. For example, pump 202 suitably increases the pressure of the fuel mixture from that of its input (for pump set 166, input 152, e.g., 1 to 5 psi, in pump set 168, input 169, e.g., approximately 20 psi) to a predetermined intermediate pressure, e.g., in pump set 166, 10 psi, and in pump set 168, 50 psi. Pump 204 suitably increases the pressure of the fuel mixture from the intermediate pressure to the predetermined pump set output pressure (for pump set 166, e.g., 20 psi, and for pump set 168, 100 psi). In each case the pressures are maintained in accordance with control signals (164) from controller 160 cooperating with the associated pressure sensor, 210 for pump 202, either pressure sensor 144 or 162 for pump 204, in pump set 166 and 168, respectively.

Figure 3:
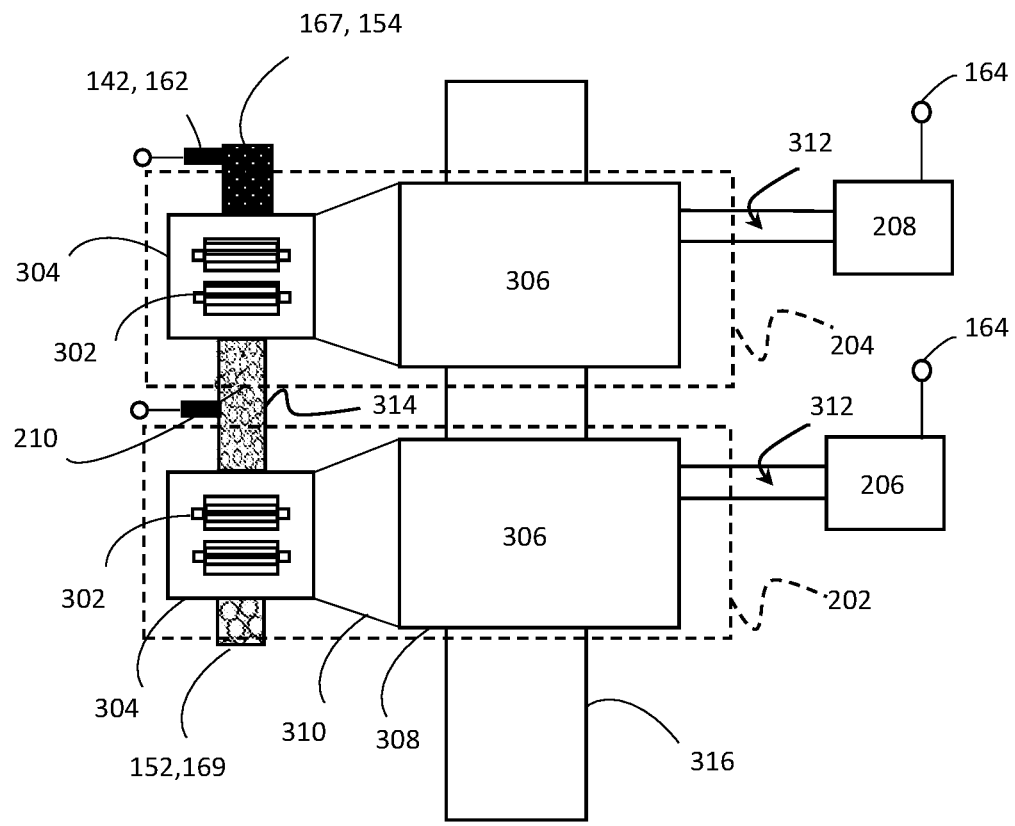
FIG. 3 is a vertical gear pump assembly suitable for use in the pump sets of FIGS. 2A and 2B.

Referring briefly to FIG. 3, pumps 202 and 204 each suitably comprises a conventional positive displacement gear pump including a set of gears 302 disposed in a casing 304 and coupled to a drive motor 306 by a motor shaft and coupling mechanism (not shown). Motor 306 is suitably contained in a motor housing 308, connected to pump casing 304 by a bell housing 310, and has a power connection 312. Pumps 202 and 204 each deliver a flow proportional to the rotational speed of the associated set of gears 302. The rotational speed of gears 302 is a function of the rotational speed of the associated motor 306, which is in accordance with the level of power applied to the motor at connection 312 by the associated variable power supply drive 206 or 208. The power provided by supplies 206 and 208 is in accordance with control signals (164) provided by controller 160 cooperating with the pressure sensor associated with the particular pump.

Pumps 202 and 204 are disposed with the output of pump 202 connected to the input of pump 204 by a suitable conduit 314. It is desirable to establish the flow path with a vertical directional component, i.e., to dispose pumps 202 and 204 with flow paths in vertical alignment (as shown in FIG. 3) or with flow paths in an upwardly sloping direction. A suitable mounting bracket, generally indicated as 316, may be employed to maintain the alignment. Fuel mixture enters the pump set (166 or 168) at its input (152 or 169), flows upwardly through and is compressed by gears 302 of pump 202, flows upwardly through conduit 314, flows upwardly through and is compressed by gears 302 of pump 204, then flows upwardly out of the pump set outlet (167 or 154). Disposing pumps 202 and 204 with a flow path having a vertical directional component, e.g., the stacked vertical pump arrangement of FIG. 3, takes advantage of the natural buoyancy of the gas in the liquid, assisting the pump action and moving the gaseous liquid in the intended direction while minimizing the possibility of any kind of gaseous cavitation or vapor lock.

In most instances pumps 202 and 204 can be substantially identical, operational differences being provided through control of pump RPM. In some cases, however, it may be desirable that pump 202 be larger than pump 204 to accommodate a greater fluid flow given the lower density of the uncompressed fuel mixture on which pump 202 operates.

In some applications, particularly where the speed of adapting to changes in pressure is not critical, two or more variable speed drive pumps, e.g., 202 and 204, can be driven by a single variable power supply drive 206. Such an embodiment is depicted in FIG. 2B. In such cases, the same level of power (in accordance with control signals 164) is applied by supply 206 to each of the pumps. In some cases, the staging of identically controlled pumps can provide the desired output pressures. Alternatively, pumps 202 and 204 could be chosen such that the motor response and/or the ultimate pumping capacity of the respective pumps to a given power input level differs.

As previously noted, gaseous component source 104 may comprise a pre-pressurized tank of the gas or a mechanism for generating the gas, and in some instances treating the gas. In the embodiment of FIG. 1, gaseous component source 104 suitably comprises a conventional air compressor (or alternatively, a hydroxy generator) 182, cooperating with a pressure sensor for generating signals (184) to controller 160 indicative of the air compressor's (or hydroxy generator's) regulated output pressure, and responsive to control signals (186) from controller 160. If desired, ancillary treatment equipment, such as a conventional gas dryer 188, may be interposed between compressor 182 and mass flow controller 134, suitably cooperating with a humidity sensor for generating signals (190) to controller 160 indicative of the air compressor output humidity, and responsive to control signals (192) from controller 160. Controller 160 suitably selectively actuates and de-actuates air compressor 182 (and gas dryer 188, if included) and generates control signals to maintain the output pressure (and humidity) of air compressor 182 at a predetermined pressure, e.g., regulated from approximately 100 psi to 30 psi (and within acceptable humidity levels).

Referring now to FIGS. 1, 4A, 4B, 4C, 4D and 4E, the operation of system 100 will now be addressed. The operation of system 100 and engine 110 is suitably initiated by an operator generated signal. In response to such signal, controller 160 initiates a start sequence, generally indicated as 500. In some cases, it may be desirable to ensure that engine 110 is properly warmed up and in stable operation before the gas-fuel mixture is applied, and engine 110 is suitably run for a predetermined period (e.g., 5 minutes) on unaltered liquid fuel, i.e., system 100 is initially run in the bypass mode for the predetermined period (generally indicated as step 502).

Figure 4A:
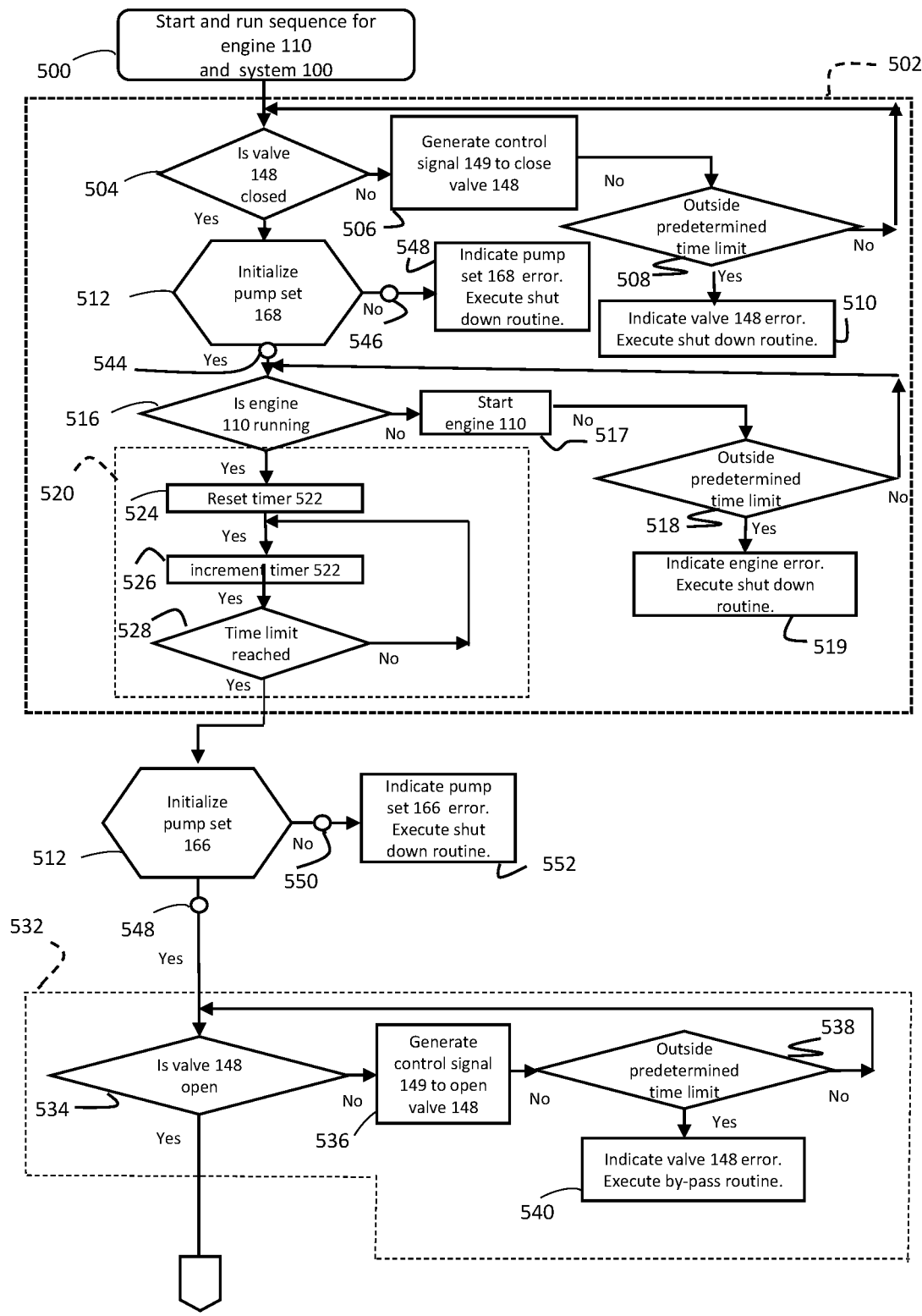
FIGS. 4A and 4B together depict a schematic flow chart of a suitable start and run sequence of the system of FIG. 1 utilizing a controller comprising an industrial digital computer (e.g. a microcontroller or Programmable Logic Controller (PLC))

In the example of FIG. 4A, the status of motorized valve 148 is checked (step 504) to ensure that it is closed to effect bypass mode operation (as would typically be the case after a controlled shutdown, but not necessarily in the event of an uncontrolled shutdown of the system). If not, control signal 149 is generated to close valve 148 (step 506). A failsafe timer routine (generally indicated as step 508) is suitably executed (comprising conventional techniques to determine if a predetermined time has passed) to ensure that valve 148 is operating, i.e., closes within a predetermined time after the generation of the associated control signal 149. If valve 148 is not closed, but the predetermined time limit has not been reached, the routine loops back to recheck the valve status (step 504). The loop continues until either valve 148 closes, or the time limit is reached. If valve 148 does not close within the predetermined time period, a valve error is indicated, and a shutdown routine (an example of which will be described in conjunction with FIG. 4D) is executed (step 510).

Figure 4B:
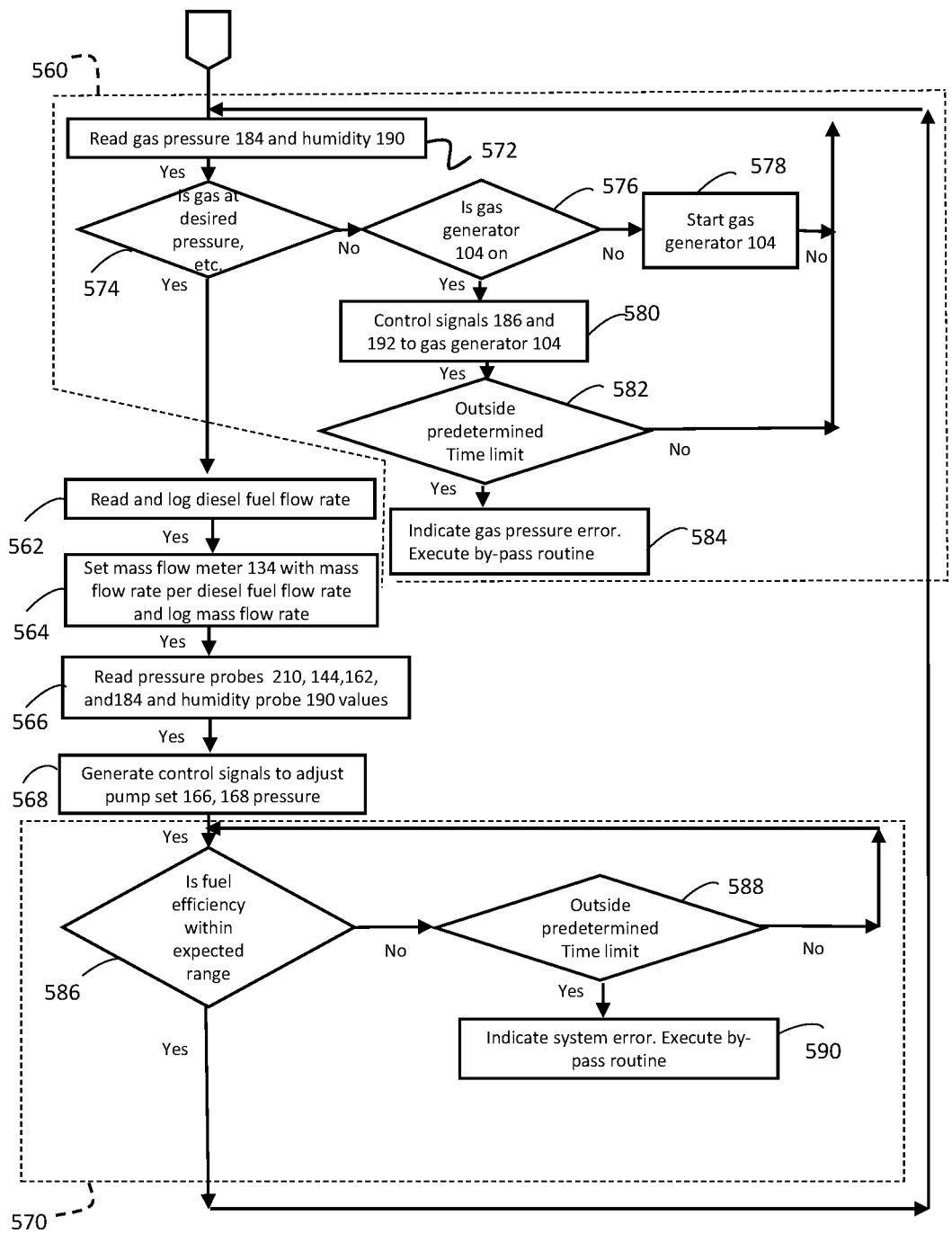
Figure 4C:
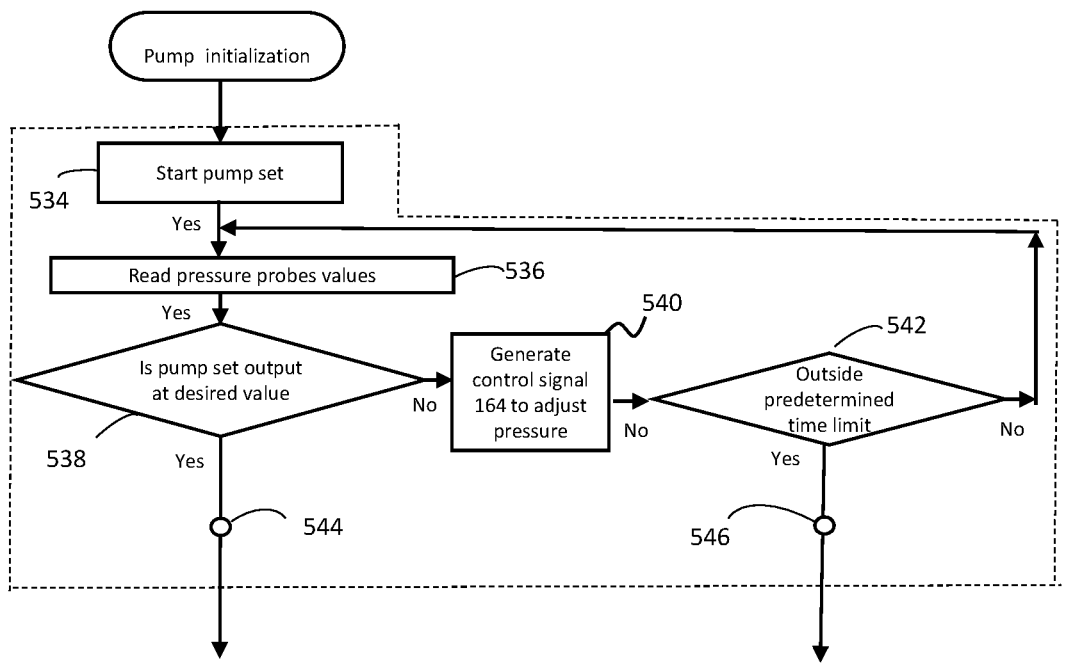
FIG. 4C is a schematic flow chart of a suitable initialization routine for the pump sets of the system of FIG. 1.

Once valve 148 is closed, second pump set 168 is then initialized, i.e., actuated and brought to its the desired output pressure (generally indicated as step 512). Referring briefly to FIG. 4C, a suitable initialization routine may include a failsafe routine to ensure that the pump set (166 or 168) being initialized is properly activated and reaches its designated output pressures. In the routine of FIG. 4C, controller 160 suitably generates an appropriate control signal 164 to start the pump set (166 or 168) (step 534). The output pressures of the respective stages of the pump set (166 or 168) are then read (e.g., from pressure sensors 210 and 144 or 162) (step 536) and compared to the desired values (step 538). Controller 160 then generates the appropriate control signals 164 to incrementally adjust pump set (166 or 168) (e.g., adjust the respective rpms of individual variable speed drive pumps comprising the pump set) toward the desired values (step 540), and the routine loops back to again read the pressure values (step 536). The loop continues until either the desired pressures are reached, exiting along path 544, or the time limit is reached (step 538). If the desired pressures have not been reached, and the predetermined time limit has not been reached, the routine loops back to recheck the pressures (step 536) and the loop repeated. However, if pump set (166 or 168) does not reach the desired pressures within the predetermined time period, the routine exits along path 546 causing an appropriate error signal and either a shutdown or a bypass routine to be executed.

Figure 4D:
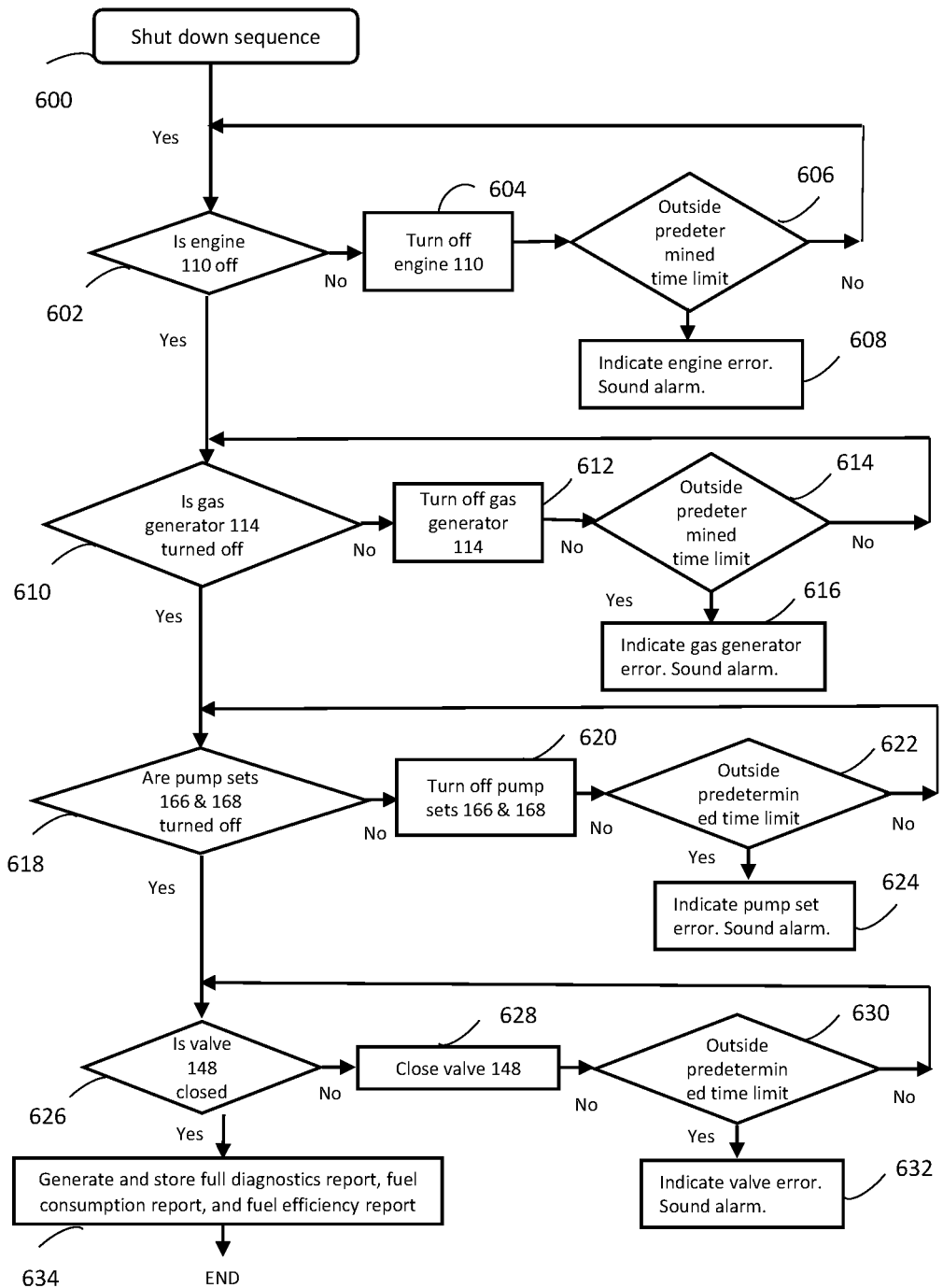
FIG. 4D is a schematic flow chart of a suitable shutdown sequence of the system of FIG. 1.
Figure 4E:
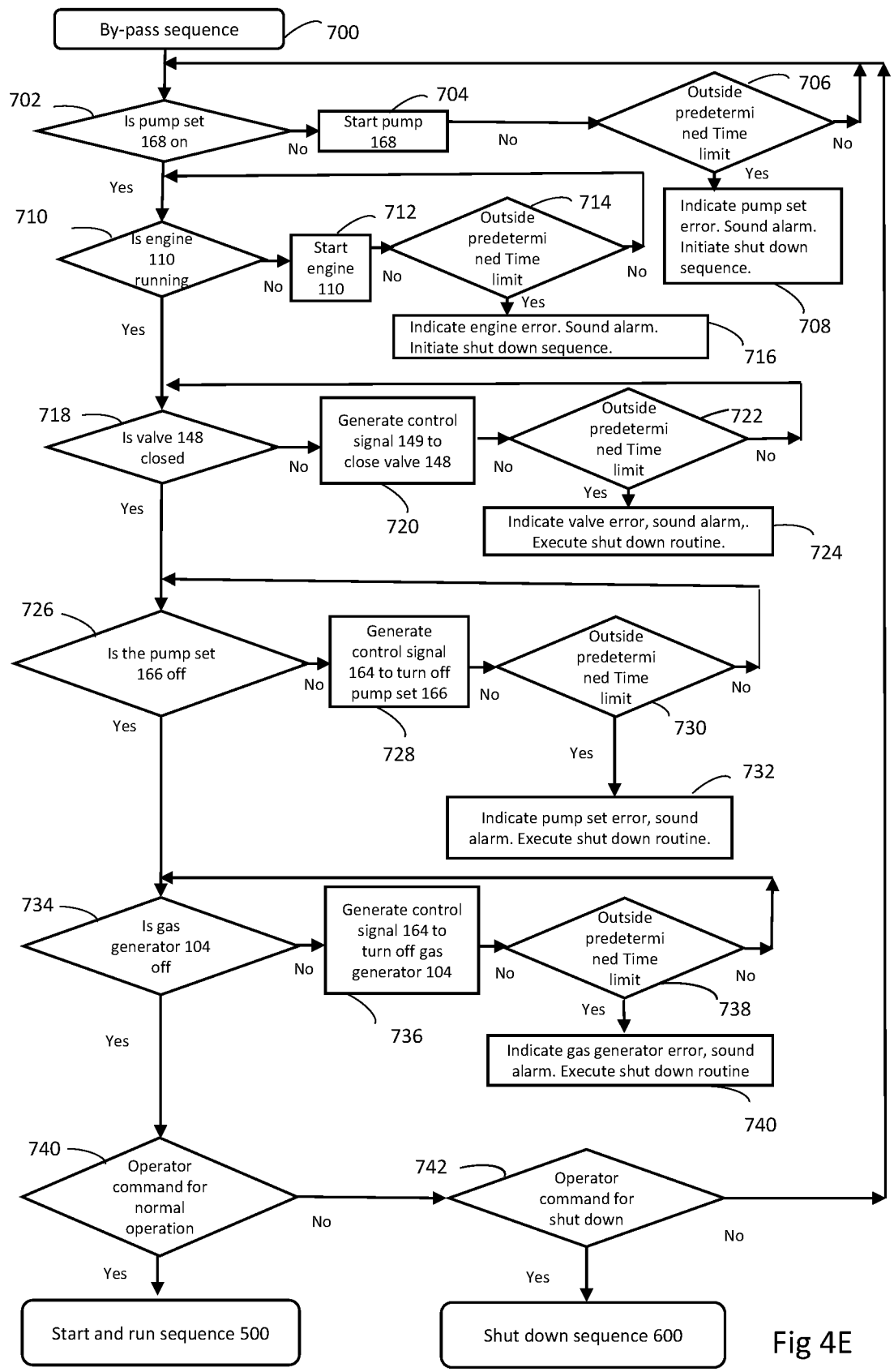
FIG. 4E is a schematic flow chart of a suitable by-pass sequence of the system of FIG. 1 utilizing a controller comprising an industrial digital computer.

Examples of suitable shutdown and bypass routines be described in conjunction with FIGS. 4D and 4E. In the case of the initialization of pump set 168 (step 512), failure to timely achieve pressures (exit along path 546) results in indication of a pump set 168 error, and execution of a suitable shutdown routine.

Assuming pump set 168 is on (thus drawing liquid fuel from fuel source 102 through system bypass loop 180), the operational status of engine 100 is checked (step 516), and if not already running, started (step 517). If desired, a failsafe routine (step 518) may be included to ensure engine 110 actually starts. After the signal to start engine is generated, the routine (step 518) loops back to engine status check (step 516). The loop continues until either the engine starts, or a time limit is reached. If the time limit is reached, and engine 110 has not started, an engine error is indicated, and a shutdown routine executed (step 519).

At this point, assuming engine has started, the engine is running on unaltered liquid fuel, with system 100 in bypass mode. A timer routine, generally indicated as 520, is then executed to maintain system 100 in bypass mode operation for the predetermined period, e.g., five minutes. For example, controller 160 suitably includes one or more counters/timers 522 (FIG. 1), which may be implemented either in software or with a special hardware module. Timer 522 may be initially reset, e.g., set to zero (step 524), then incremented (step 524). The contents are then compared against a count corresponding to the predetermined time period (step 526). If the comparison indicates that the time period is not yet been reached, then timer 522 is then again incremented (step 524).

If the comparison (step 528) indicates that the time period has been reached, initialization for normal operation (providing a gas-liquid mixture) is initiated. In the example of FIG. 4A, first variable pressure pump set 166 is initialized, i.e. actuated and brought to its desired output pressure (step 530) and motorized valve 148 is opened (generally indicated as step 532). If desired, gas generator 104 (and its various components) may also be actuated and, in some cases, the process of attaining the desired gaseous component pressure and characteristics initiated (step 542). Steps 530, 532, and 542 may be initiated in sequence (as shown in FIGS. 4A and 4B) or one or more can be executed consecutively.

The initialization of pump set 166 (step 530), is essentially the same as the initialization of pump set 168 (step 512), previously described. Once pump set 166 achieves the predetermined pressures the initialization exits at path 548, and, e.g., motorized valve 148 opened (step 532). If pump set 166 does not reach the desired pressures within a predetermined time period, a pump set 166 error is indicated, and a bypass routine (an example of which will be described in conjunction with FIG. 4E) is executed (step 552).

Motorized valve 148 is opened (step 532), either upon pump set 166 reaching its desired values, or, in some instances, particularly where no failsafe routine for actuating pump set 166 is included, substantially contemporaneously with actuation of pump set 166). In the example of FIG. 4A, the status of motorized valve 148 is checked (step 534) to ensure that it is open (step 534). If not, (as is usually the initial case) an appropriate control signal 149 is generated to open valve 148 (step 536) and a failsafe timer routine (step 538) is suitably executed to ensure that valve 148 opens within a predetermined time period after the generation of the associated control signal 149. If valve 148 is not opened, but the predetermined time limit has not been reached, the routine loops back to recheck the valve status (step 534). The loop continues until either valve 148 opens, or the time limit reached. If valve 148 does not open within the predetermined time period, a valve 166 error is indicated, and a bypass routine is executed (step 540).

With the opening of valve 148, system 100 is prepared to enter normal operating mode, with a gas-liquid fuel mixture provided to engine 102. The operation of gas generator 104 is initiated and brought to the desired operating gas component pressure (step 560); the liquid fuel flow rate from flowmeter 130 is read by controller 160 (step 562); gaseous component mass flow controller 134 is set to provide a gas mass flow rate in accordance with the liquid fuel flow rate (step 564); the pressure values from the various pressure sensors 210, 144, and 162 are read (step 566); the pressure values associated with pump sets 166 and 168 are compared to the corresponding desired pressures, and control signals 164 generated to incrementally adjust pump sets 166 and 168 (e.g., adjust the respective RPMs of individual variable speed drive pumps comprising the respective pump sets) toward the desired values (step 568), and the routine loops back to again check the status of gas generator 104 (step 560). If desired, an overall system check generally indicated as 570, can be incorporated into the loop. If desired, pressure and other parameters read by controller 160 can be logged to maintain a record.

More particularly, in the example of FIGS. 4A-4E, status check of gas generator 104 step 560 ensures that it is operating properly, and providing the gaseous component to the system at the proper pressure and with such other characteristics, e.g., humidity, as are desired. The output pressure (184) of gas generator 104 (e.g. air compressor 182), as well as operating parameters of ancillary equipment, e.g., gas dryer 188 humidity indicia (190) are read (step 572), and compared to desired values by controller 160 (step 574). If the gas is being provided with the desired pressure and other characteristics, the routine proceeds to the next step, e.g., step 562. If, however, the gas is not being provided with the desired pressure and other characteristics, a check is made to determine that gas generator e.g., air compressor 182 and ancillary devices, e.g., dryer 188 are on (step 576). If not, controller 160 generates appropriate control signals 186 (and 192) to actuate the devices (step 578), and the process loops back to repeat beginning with reading the gas pressure and other characteristics (step 572). If, in step 576, it is determined that the devices are on, controller 160 generates appropriate control signals 186 (and 192) to incrementally adjust the characteristics towards the desired value (step 580), and the process loops back to repeat beginning with reading the gas pressure and other characteristics (step 572). A failsafe timer routine (step 582) is suitably incorporated into the loop to indicate a gas generator error, and execute a bypass routine (step 584) in the event that gas generator 104 is not operating properly and providing the gaseous component to the system at the proper pressure and with such other characteristics as are desired within a predetermined time from e.g., being turned on.

If desired, after adjustments have been made to pump sets 166 and 168 (step 568) system check 570, essentially a failsafe timer routine to ensure that system 100 is providing expected fuel efficiency, may be included in the process loop. For example, for a given engine load, a predetermined maximum liquid fuel flow is anticipated with system 100 in normal operation. Controller 160 suitably compares the liquid fuel flow (132) to predetermined values associated with the instantaneous load on engine 110 (step 586). If liquid fuel flow (132) continues to exceed the maximum value for the instantaneous load for more than a predetermined time period (step 588), a system error is indicated, and a bypass routine is executed (step 590).

Referring now to FIG. 4D, the shutdown of system 100 and engine 110 is suitably initiated by an operator generated signal. In response to such signal, controller 160 initiates a shutdown sequence, generally indicated as 600. The engine status is suitably checked (step 602) and if the engine is running, a control signal is generated to turn the engine off (step 604) and a failsafe timer routine (step 606) suitably executed to ensure engine 110 actually turns off, looping back to engine status check (step 602). The loop continues until either the engine turns off, or a time limit is reached. If the time limit is reached, and engine 110 has not turned off, an engine error is indicated, and alarm e.g., sounded (step 608).

A check is then made to determine if gas generator 104, e.g., air compressor 182 and ancillary devices, e.g., dryer 188, is off (step 610). If not (and it typically would be on when the stop routine is initiated), controller 160 generates appropriate control signals 186 (and 192) to deactivate the devices (step 612), and a failsafe timer routine (step 614) executed to ensure gas generator 104 actually turns off, looping back to gas generator status check (step 610). The loop continues until either gas generator 104 turns off, or a time limit is reached. If the time limit is reached, a gas generator error is indicated, and an alarm is sounded (step 616).

A check is then made to determine if pump sets 166 and 168 are turned off (step 618). If not (and they typically would be on when the stop routine is initiated), controller 160 generates appropriate control signals (164) to deactivate the devices (step 620), and a failsafe timer routine (step 622) executed to ensure gas generator 104 actually turns off, looping back to pump set status check (step 618). The loop continues until either pump sets 166 and 168 turn off, or a time limit is reached. If the time limit is reached, a pump set error is indicated, and an alarm is sounded (step 624).

A check is then made to determine if motorized valve 148 is closed (step 626). If not (and it typically would be open when the stop routine is initiated with system 100 in normal operation), controller 160 generates appropriate control signals (149) to close valve 148 (step 628), and a failsafe timer routine (step 630) executed to ensure gas generator 104 actually turns off, looping back to motorized valve on 48 status check (step 626). The loop continues until either it is determined that valve 148 is closed, or a time limit is reached. If the time limit is reached, a valve error is indicated, and an alarm is sounded (step 624).

If desired, after motorized valve 148 is closed, various reports e.g., diagnostics, fuel consumption, and/or fuel efficiency, can be generated and stored (step 634).

As previously mentioned, under some circumstances, e.g., during initialization or repair of system 100, and instances when some element is not working properly, it may be desirable to controllably bypass portions of system 100 so that unaltered liquid fuel is supplied to engine 110. Referring to FIG. 4E, a suitable bypass sequence 700 would be executed in response to a call from e.g., start and run sequence 500, or an operator generated signal (in the event that the operator wants system 100 to operate in bypass mode). The status of pump set 168 is checked (step 702). If pump set 168 is not already on, controller 160 generates appropriate control signals (164) to activate pump set 168 (step 704), and a failsafe timer routine (step 706) executed to ensure pump set 168 actually turns on, looping back to pump set 168 status check (step 702). The loop continues until either is established that pump set 168 is running, or a time limit is reached. If the time limit is reached, a pump set error is indicated, an alarm is sounded, and shut down sequence 600 is initiated (step 708).

After it is established that pump set 168 is on, the status of engine 110 is checked (step 710). If engine 110 has not already been started, a control signal is generated to turn start engine 110 (step 712), and a failsafe timer routine (step 714) suitably executed to ensure engine 110 actually turns on, looping back to engine status check (step 710). The loop continues until either it is established that engine 110 is running, or a time limit is reached. If the time limit is reached, and engine 110 is not running, an engine error is indicated, an alarm is sounded, and shut down sequence 600 is initiated (step 716).

After it is established that engine 110 is running, the status of motorized valve 148 is checked (step 718). If valve 148 is not already closed, controller 160 generates control signal 149 to close valve 148 (step 720), and a failsafe timer routine (step 722) suitably executed to ensure valve 148 actually closes, looping back to valve status check (step 718). The loop continues until either it is established that valve 148 is closed, or a time limit is reached. If the time limit is reached, and engine 110 is not running a valve error is indicated, an alarm is sounded, and shut down sequence 600 is initiated (step 716).

After it is established that valve 148 is closed, the status of pump set 166 is checked (step 726). If pump set 166 is not already off, controller 160 generates appropriate control signals (164) to deactivate pump set 166 (step 728), and a failsafe timer routine (step 730) executed to ensure pump set 166 actually turns on, looping back to pump set 166 status check (step 726). The loop continues until either is established that pump set 166 is not running, or a time limit is reached. If the time limit is reached, a pump set error is indicated, an alarm is sounded, and shut down sequence 600 is initiated (step 732).

After it is established that that pump set 166 is not running, the status of gas generator 104 is checked (step 734). If gas generator 104 has not already been shut down, controller 160 generates appropriate control signals (e.g., 186, 192) to deactivate gas generator 104 (step 736), and a failsafe timer routine (step 738) executed to ensure pump set 166 actually turns on, looping back to pump set 166 status check (step 734). The loop continues until either is established that gas generator 104 is not running, or a time limit is reached. If the time limit is reached, a gas generator error is indicated, an alarm is sounded, and shut down sequence 600 is initiated (step 730).

After it has been established that gas generator 104 is not running, checks are made to determine if there have been operator commands to assume normal running operation (step 740) or to shutdown (742). If so, start and run sequence 500 or shut down sequence 600 is initiated, accordingly. Otherwise, routine 700 loops back to recheck the status of pump set 168 (step 702) and routine 700 repeated.

In the embodiment of FIG. 1, engine 110 is described as having a common rail injection mechanism. However, system 100 can also be used in conjunction with an engine employing mechanical injection system. In such a case, second pump set 168 would effectively replace the original mechanical booster pump, i.e., the output of pump set 168 would be applied to the injection pump of the engine injection mechanism (albeit fuel filters may be interposed).

Although the present invention has been described in conjunction with various exemplary embodiments, the invention is not limited to the specific forms shown, and it is contemplated that other embodiments of the present invention may be created without departing from the spirit of the invention. Variations in components, materials, values, structure and other aspects of the design and arrangement may be made in accordance with the present invention as expressed in the following claims.

The invention claimed is:

1. A fuel enhancement system, adapted to cooperate with an engine, a source of liquid fuel, and a source of gaseous component, for supplying the engine with a pressurized fuel mixture comprising a mixture of the liquid fuel and the gaseous component, where, in the operation of the engine, the engine uses a part of the fuel mixture supplied to the engine, and at least part of the fuel mixture supplied to the engine, but unused by the engine, flows out of the engine as return fuel, and the source of liquid fuel provides an amount of liquid fuel to the fuel enhancement system corresponding to the amount of liquid fuel used by the engine as liquid makeup fuel, the fuel enhancement system comprising:
a variable pressure pump system, having an input and an output, responsive to control signals applied thereto, varying the pressure at its output relative to the pressure at its input by a variable amount in accordance with the control signals;
a metering device, disposed in fluid communication with the liquid fuel source up stream of the pump system input, for generating indicia of the flow of the liquid makeup fuel supplied to the fuel enhancement system during operation of the engine;
a flow control device, disposed in fluid communication with the gaseous component source and responsive to indicia of the flow of the liquid makeup fuel supplied to the fuel enhancement system during operation of the engine, for supplying a controlled flow of gaseous component having a flow corresponding to a desired proportion of the flow of the liquid makeup fuel supplied to the fuel enhancement system;
the pump system input being receptive of the metered liquid makeup fuel, the controlled flow of gaseous component, and at least part of the return fuel mixture from the engine;
the pump system cooperating with an infusion volume configured such that the fuel mixture that has flowed through the infusion volume has bubbles of the gaseous component distributed substantially uniformly throughout the mixture;
the engine being supplied with fuel mixture that has flowed through the infusion volume at a pressure established by the pump system; and
a control system, including at least one pressure sensing device, for generating control signals to the pump system such that the pressure of the fuel mixture supplied to the engine is maintained substantially at a predetermined pressure value.

2. The system of claim 1 the liquid fuel metering device generates indicia of the mass flow of the liquid fuel, and the gaseous component flow control device supplies a controlled flow of gaseous component having a mass flow corresponding to a desired proportion of the mass flow of the liquid makeup fuel supplied to the fuel enhancement system.

3. The system of claim 1 wherein the pump system comprises at least one variable speed drive pump.

4. The system of claim 3 wherein the control system includes a pressure sensing device disposed to provide indicia of the output pressure of the pump system, and the variable speed drive pump is responsive to control signals indicative of deviation of the output pressure of the pump system from a desired value.

5. The system of claim 3 wherein the control system includes a pressure sensing device disposed to provide indicia of the pressure of the fuel mixture supplied to the engine and the variable speed drive pump is responsive to control signals indicative of deviation of the pressure of the fuel mixture supplied to the engine from a desired value.

6. The system of claim 3 wherein the control system includes a pressure sensing device disposed to provide indicia of the pressure at output of the variable speed drive pump and the variable speed drive pump is responsive to control signals indicative of deviation of the output pressure of the variable speed drive pump from a desired value.

7. The system of claim 1 wherein the variable pressure pump system comprises a first variable speed drive pump having an input and an output, and a second variable speed drive pump having an input and an output, connected such that the first variable speed drive pump input is receptive of the metered liquid makeup fuel, the controlled flow of gaseous component, and at least part of the return fuel mixture from the engine and the second variable speed drive pump input is in fluid communication with the output of the first variable speed drive pump.

8. The system of claim 7 wherein the control system includes a pressure sensing device disposed to provide indicia of the output pressure of the variable pressure pump system, and the first and second variable speed drive pumps are each responsive to control signals indicative of deviation of the output pressure of the variable pressure pump system from a desired value.

9. The system of claim 7 wherein the control system includes a first pressure sensing device disposed to provide indicia of the output pressure of the first variable speed drive pump, and a second pressure sensing device disposed to provide indicia of the output pressure of the second variable speed drive pump, and the first variable speed drive pump is responsive to control signals indicative of deviation of the output pressure of the first variable speed drive pump from a desired value, and the second variable speed drive pump is responsive to control signals indicative of deviation of the output pressure of the second variable speed drive pump from a desired value.

10. The system of claim 1 wherein the gaseous component is air, and the source of gaseous component is a compressor.

11. The system of claim 10 wherein the liquid fuel is diesel.

12. The system of claim 10 further including an air dryer disposed between the compressor and the mass flow control device.

13. The system of claim 1 further including an accumulator in fluid communication with the input of the variable pressure pump system.

14. The system of claim 1 further including a system bypass line including a valve for selectively creating a fluid path from the input of the variable pressure pump system to selectively supply liquid fuel to the engine, bypassing the variable pressure pump system and infusion volume.

15. The system of claim 14 further includes a flow sensing device disposed to generating indicia of flow through the system bypass line and a pump, cooperating with the system bypass line, responsive to control signals applied thereto, wherein the control system is responsive to indicia of flow through the system bypass line and generates control signals to the pump such that liquid fuel selectively supplied to the engine through the bypass line, is supplied to the engine at least a predetermined pressure.

16. The system of claim 15 wherein, upon starting of the engine, the control system, for a predetermined time period, actuates the valve to permit flow through the bypass line, and actuates the pump cooperating with the bypass line, to facilitate starting the engine irrespective of residual gaseous component in the engine.

17. The system of claim 1 wherein the gaseous component is hydroxy, and the source of gaseous component is a hydroxy generator.

18. The system of claim 17 wherein the liquid fuel is diesel.

19. The system of claim 1 wherein the gaseous component is hydrogen.

20. The system of claim 1 wherein the engine includes an injection mechanism including a pressurizing pump operating upon the fuel mixture supplied to the engine, such pressurizing pump being susceptible to degraded pumping efficiency in the presence of a fuel mixture having a volumetric ratio of gaseous component to liquid fuel exceeding a threshold value; and the pump system and control system cooperate to maintain the pressure of the fuel mixture supplied to the engine at a value such that the volumetric ratio of gaseous component to liquid fuel is maintained below the threshold value.

21. The system of claim 1 wherein the pump system and control system cooperate to maintain the pressure of the fuel mixture supplied to the engine at a value such that the fuel mixture supplied to the engine exhibits substantially liquid characteristics.

22. A method for supplying an engine with a pressurized fuel mixture having a liquid component and a gaseous component, the engine being of the type wherein a part of the fuel supplied is consumed by the engine and the unconsumed part of the fuel supplied flows out of the engine as return fuel, the method comprising the steps of:

providing a metered mass flow of the liquid fuel component provided to the engine;

providing a controlled mass flow of the gaseous fuel component corresponding to a desired proportion of the metered mass flow of the liquid fuel component;

combining the metered mass flow of the liquid fuel component, controlled mass flow of the gaseous fuel component, and return fuel into a mixture flow;

passing the mixture flow through an infusion volume such that the gaseous component is distributed substantially uniformly throughout the mixture; and applying the mixture flow to the engine after passing through the infusion volume at a substantially constant pressure, wherein the mixture flow to the engine is applied to a variable speed drive pump and the speed of the pump is varied.

23. The method of claim 22 further including the step of, for a predetermined time period upon starting the engine, applying liquid fuel to the engine at a pressure sufficient to maintain potential bubbles of residual gaseous component below a desired threshold size to facilitate starting the engine irrespective of residual gaseous component in the engine.

24. A fuel enhancement system, adapted to cooperate with an engine, a source of liquid fuel, and a source of gaseous component, for supplying the engine with a pressurized fuel mixture comprising a mixture of the liquid fuel and the gaseous component, where, in the operation of the engine, the engine uses a part of the fuel mixture supplied to the engine, and at least part of the fuel mixture supplied to the engine, but unused by the engine, flows out of the engine as return fuel, and the source of liquid fuel provides an amount of liquid fuel to the fuel enhancement system corresponding to the amount of liquid fuel used by the engine as liquid makeup fuel, the fuel enhancement system comprising:
  at least one variable speed drive pump, having an input and an output, responsive to control signals applied thereto, the speed of the pump being in accordance with the control signal;
  a metering device, disposed in fluid communication with the liquid fuel source up stream of the pump system input, for generating indicia of the mass flow of the liquid makeup fuel supplied to the fuel enhancement system during operation of the engine;
  a mass flow control device, disposed in fluid communication with the gaseous component source and responsive to indicia of the mass flow of the liquid makeup fuel supplied to the fuel enhancement system during operation of the engine, for supplying a controlled flow of gaseous component having a mass flow corresponding to a desired proportion of the mass flow of the liquid makeup fuel supplied to the fuel enhancement system;
  the variable speed drive pump input being receptive of the metered liquid makeup fuel, the controlled flow of gaseous component, and at least part of the return fuel mixture from the engine;
  the variable speed drive pump cooperating with an infusion volume configured such that the fuel mixture that has flowed through the infusion volume has bubbles of the gaseous component distributed substantially uniformly throughout the mixture;
  the engine being supplied with fuel mixture that has flowed through the infusion volume at a pressure established, at least in part, by the variable speed drive pump; and
  a control system, including at least one pressure sensing device, for generating control signals to the variable speed drive pump such that the pressure of the fuel mixture supplied to the engine is maintained at a substantially constant predetermined pressure.

25. The system of claim 24 including two serially connected variable speed drive pumps, responsive to the control signals.

26. A fuel enhancement system, adapted to cooperate with an engine, a source of liquid fuel, and a source of gaseous component, for supplying the engine with a pressurized fuel mixture comprising a mixture of the liquid fuel and the gaseous component, where, in the operation of the engine, the engine uses a part of the fuel mixture supplied to the engine, and at least part of the fuel mixture supplied to the engine, but unused by the engine, flows out of the engine as return fuel, and the source of liquid fuel provides an amount of liquid fuel to the fuel enhancement system corresponding to the amount of liquid fuel used by the engine as liquid makeup fuel,
  the fuel enhancement system comprising:
  a variable pressure pump system, having an input and an output, providing an output pressure at its output that varies relative to the pressure at its input by an amount in accordance with control signals applied thereto;
  at least one pressure sensor for generating indicia of a pressure associated with the variable pressure pump system;
  a metering device, disposed in fluid communication with the liquid fuel source, for generating indicia of the flow of the liquid makeup fuel supplied to the fuel enhancement system during operation of the engine;
  a flow control device, disposed in fluid communication with the gaseous component source, for supplying a controlled flow of gaseous component in accordance with control signals applied thereto;
  the pump system input being receptive of the metered liquid makeup fuel, the controlled flow of gaseous component, and at least part of the return fuel mixture from the engine;
  the pump system cooperating with an infusion volume configured such that the fuel mixture that has flowed through the infusion volume has bubbles of the gaseous component distributed substantially uniformly throughout the mixture;
  the engine being supplied with fuel mixture that has flowed through the infusion volume at a pressure established by the pump system; and
  a control system, responsive to indicia of the flow of the liquid makeup fuel supplied to the fuel enhancement system during operation of the engine, and indicia of a pressure associated with the variable pressure pump system, for generating control signals
  to the gaseous component flow control device, such that the controlled flow of gaseous component corresponds to a desired proportion of the flow of the liquid makeup fuel supplied to the fuel enhancement system; and
  to the pump system such that the pressure of the fuel mixture supplied to the engine is maintained substantially at a predetermined pressure value.

27. The system of claim 26 wherein the indicia of a pressure associated with the variable pressure pump system comprises indicia of the output pressure of the variable pressure pump system.

28. The system of claim 26 wherein:
  the variable pressure pump system comprises at least a first variable speed drive pump disposed upstream of the infusion volume, and at least a second variable speed drive pump disposed downstream of the infusion volume, the first and second variable speed drive pumps providing respective output pressures in accordance with the speeds thereof, the speeds of the first and second variable speed drive pumps being in accordance with control signals applied thereto;
  the fuel enhancement system includes a first pressure sensor for generating indicia of the output pressure of the first variable speed drive pump and a second pressure sensor for generating indicia of the output pressure of the second variable speed drive pump; and
  the control system is responsive to indicia of the output pressure of first variable speed drive pump and indicia of the output pressure of the second variable speed drive pump and generate control signals to the first and second variable speed drive pumps such that the output pressure of the first variable speed pump is maintained substantially equal to a first predetermined pressure and the output pressure of the second variable speed pump is maintained substantially equal to a second predetermined pressure.

29. The system of claim 26 further including a heat exchanger disposed to operate upon at least the part of the return fuel mixture received at the pump system input.

30. A fuel enhancement system, adapted to cooperate with an engine, a source of liquid fuel, and a source of gaseous component, for supplying the engine with a pressurized fuel mixture comprising a mixture of the liquid fuel and the gaseous component, comprising:
  a metering device, disposed in fluid communication with the liquid fuel source, for generating indicia of the metered flow of the liquid fuel supplied to the fuel enhancement system during operation of the engine;

a flow control device, disposed in fluid communication with the gaseous component source, for supplying a controlled flow of gaseous component in accordance with control signals applied thereto;

at least a first variable speed drive pump, receptive of the metered flow of the liquid fuel and the controlled flow of gaseous component, and responsive to control signals applied thereto, for providing an output flow of liquid-gaseous component fuel mixture at an output pressure in accordance with the speed thereof;

a first pressure sensor for generating indicia of the output pressure of the first variable speed drive pump;

an infusion volume, receptive of the output flow of liquid-gaseous component fuel mixture from the first variable speed drive pump and configured to provide an output flow of fuel mixture having bubbles of the gaseous component distributed substantially uniformly throughout the fuel mixture;

at least a second variable speed drive pump, receptive of the output flow of the infusion volume, and responsive to control signals applied thereto, for providing an output flow of liquid-gaseous component fuel mixture at an output pressure in accordance with the speed thereof;

a second pressure sensor for generating indicia of the output pressure of the second variable speed drive pump; and a control system, responsive to indicia of the metered flow of liquid fuel, indicia of the output pressure of first variable speed drive pump and indicia of the output pressure of the second variable speed drive pump, for generating control signals to the gaseous component flow control device, such that the controlled flow of gaseous component corresponds to a desired proportion of the metered flow of liquid fuel;

to the first variable speed drive pump such that the output pressure of the first variable speed pump is maintained substantially equal to a first predetermined pressure; and to the second variable speed drive pump such that the output pressure of the second variable speed pump is maintained substantially equal to a second predetermined pressure;

the output flow of the second variable speed drive pump being supplied to the engine.

31. The system of claim 30 wherein the control system comprises a programmed logic controller.

32. A method for supplying an engine with a pressurized fuel mixture having a liquid component and a gaseous component, the engine being of the type wherein a part of the fuel supplied is consumed by the engine and the unconsumed part of the fuel supplied flows out of the engine as return fuel, the method comprising the steps of:

providing a metered mass flow of the liquid fuel component provided to the engine;

providing a controlled mass flow of the gaseous fuel component corresponding to a desired proportion of the metered mass flow of the liquid fuel component;

combining the metered mass flow of the liquid fuel component, controlled mass flow of the gaseous fuel component, and return fuel into a mixture flow;

passing the mixture flow through an infusion volume such that the gaseous component is distributed substantially uniformly throughout the mixture;

applying the mixture flow to the engine after passing through the infusion volume at a substantially constant pressure; and for a predetermined time period upon starting the engine, applying liquid fuel to the engine at a pressure sufficient to maintain potential bubbles of residual gaseous component below a desired threshold size to facilitate starting the engine irrespective of residual gaseous component in the engine.

* * * * *